Jan. 16, 1951  L. S. WILLIAMS  2,537,948
RACK DRIVE FRAME
Filed Aug. 9, 1949  2 Sheets-Sheet 1
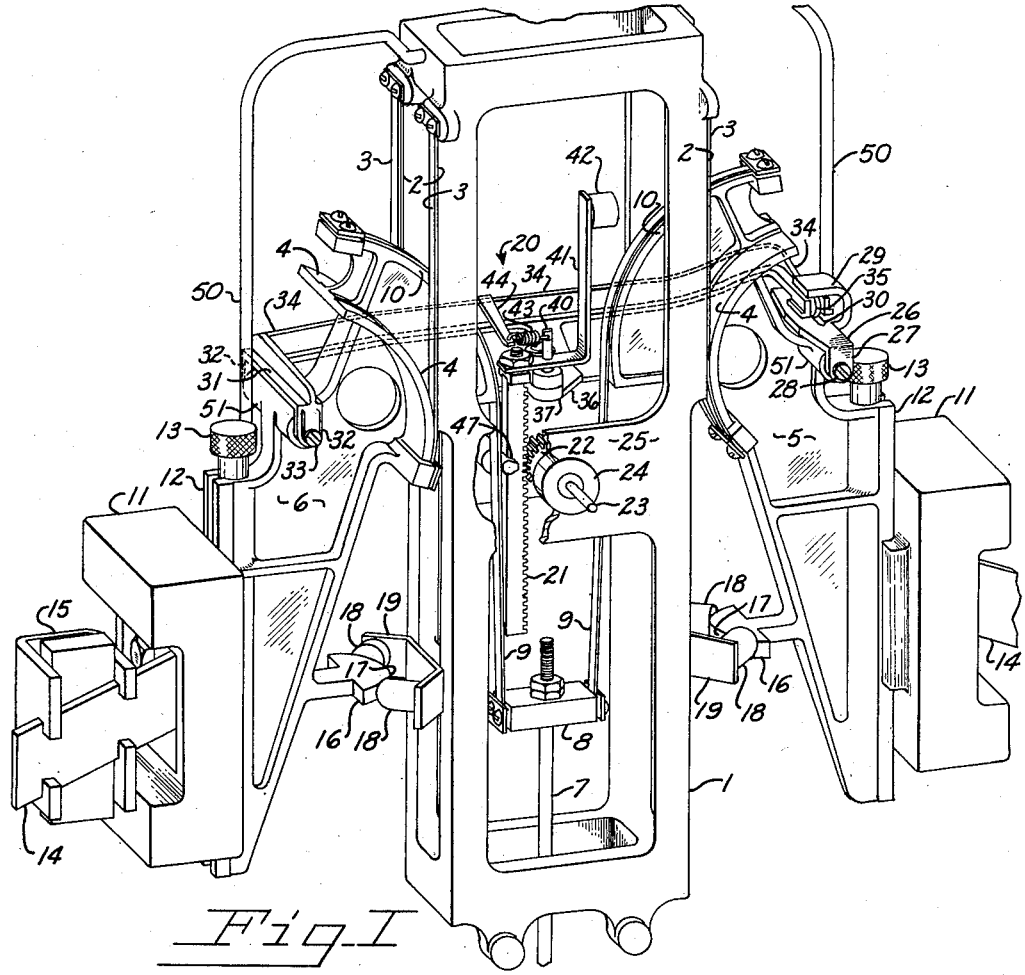
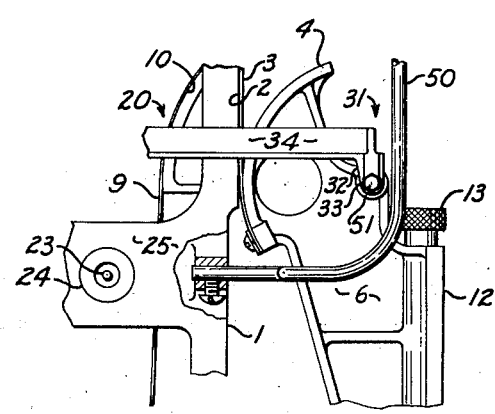
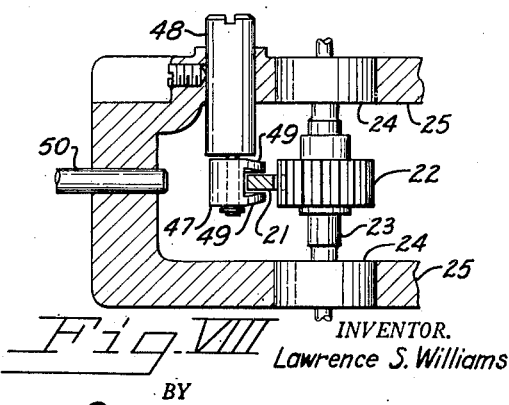
INVENTOR.
Lawrence S. Williams
BY
Marshall, Marshall & Leonard
ATTORNEYS

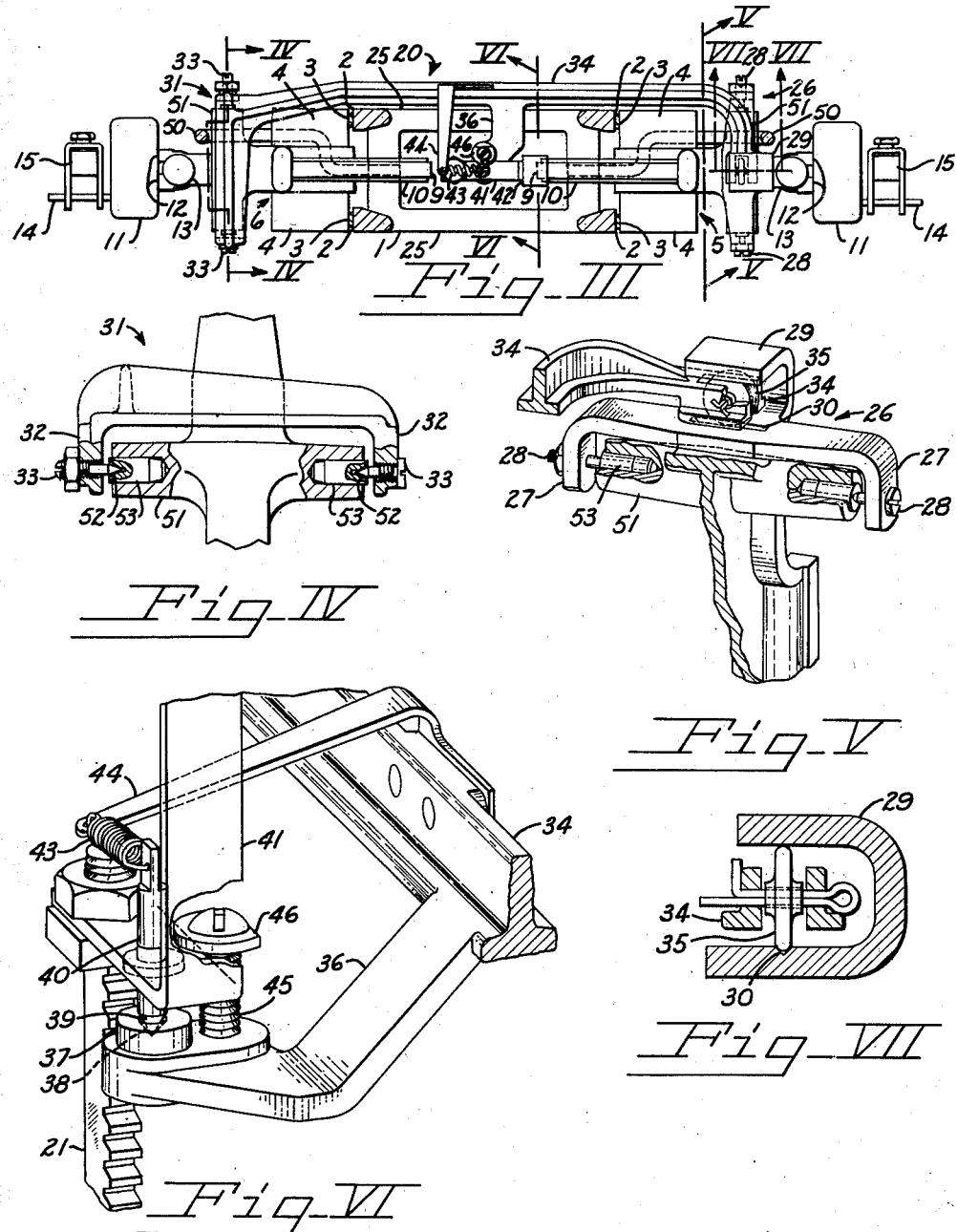

Patented Jan. 16, 1951

2,537,948

UNITED STATES PATENT OFFICE 2,537,948

RACK DRIVE FRAME

Lawrence S. Williams, Toledo, Ohio, assignor to Toledo Scale Company, Toledo, Ohio, a corporation of New Jersey Application August 9, 1949, Serial No. 109,344

12 Claims. (Cl. 265—62)

This invention relates to weighing scales and in particular to improvements in the mechanism for driving an indicator according to the movement of load counterbalancing pendulums.

Floating pendulums—pendulums that are suspended and the turning axes of which are translated as the pendulum rotates in response to changes in load—have been used in weighing scales and the translation of the turning axes has been used as a measure of load. In order to use this translation it is necessary to support a light framework or similar mechanism from the pendulums and to employ a rack and pinion or its equivalent to rotate an indicator shaft according to the translation of the pendulum supported frame. While this system of load counterbalancing and indication has been commercially satisfactory, the friction developed between the pendulums and the light frame carried thereon constitutes one of the major sources of error in the weighing scale.

Since one of the functions of the pendulum supported frame is to hold the pendulum sectors from swinging away from the sector guide, the pivotal connections between the frame and the pendulums have to be sufficiently strong to withstand the maximum disturbing force likely to be encountered. This requires that the pivotal connections be much heavier and consequently much more subject to friction than the delicate pivotal connections that would be adequate if their only function were to drive the indicator.

The principal object of this invention is to provide separate means for confining the pendulums to their intended path of travel and for driving the indicator according to the movement of the pendulums.

Another object is to provide mechanism having a minimum number of pivotal connections for driving the indicator according to the pendulum travel.

Another object is to provide separate guards for limiting the deviation of the pendulum bodies from their intended paths of travel.

A still further object of the invention is to provide a rack supporting structure that can accommodate misalignment of the pendulums without developing any frictional effects or binding that would adversely affect the accuracy of load indication.

More specific objects and advantages are apparent from the following description of a preferred embodiment of the invention.

According to the invention, the rack that drives the indicator is supported from a lightweight framework consisting of two principal members: a lightweight yoke pivotally supported on the turning axis of one of the pendulums and a second member that includes a yoke-like portion pivotally supported on the turning axis of the other pendulum and an arm the end of which is supported on the first yoke. The frame thus kinematically consists of two triangles the bases of which are co-linear with the turning axes of the pendulums, one of the triangles being located with its apex vertically above its base with said apex supporting the apex of the other triangle. This other triangle is disposed in a generally horizontal plane and the rack is suspended from the midpoint of its altitude, i. e., a point midway between the turning axes of the pendulums. To maintain the first yoke—the vertical yoke—in upright position it is provided with a groove extending parallel to the turning axis of the pendulum and the arm extending from the other yoke is provided with a small roller the periphery of which engages the groove.

Since this rack supporting structure is incapable of resisting lateral displacement of the pendulums, guards are provided which, extending parallel to the path of travel of the turning axes of the pendulums, are closely adjacent cylindrical portions of the pendulum in position to confine the pendulums to their intended paths.

In the accompanying drawings, the improved rack supporting and driving mechanism is illustrated as it is installed in the load counterbalancing mechanism of a weighing scale.

In the drawings:

Figure I is a perspective view of a floating pendulum load counterbalancing mechanism employing the new rack support and drive.

Figure II is a fragmentary elevation showing the cooperation between a cylindrical portion of a pendulum body and a guard.

Figure III is a plan view of the improved structure as seen from a plane just above the uppermost points of the load counterbalancing pendulums.

Figure IV is a fragmentary elevation, with parts shown in section, of one of the pendulums as seen from the line IV—IV of Figure III.

Figure V is a fragmentary perspective view of the other pendulum as seen from the line V—V of Figure III.

Figure VI is a fragmentary perspective view of the connection between the rack and the supporting frame as seen from the line VI—VI of Figure III.

Figure VII is a fragmentary elevation of the connection between the small yoke and the roller in the end of the arm of the frame as seen from the line VII—VII of Figure III.

Figure VIII is a fragmentary horizontal section showing the cooperation between the rack, the pinion on the indicator shaft, and a guide that maintains the rack in engagement with the pinion.

These specific figures and the accompanying description are intended merely to illustrate the invention but not to impose limitations on the claims.

In a load counterbalancing mechanism embodying the invention an upright frame or sector guide 1 has spaced apart vertical rails 2 to the upper ends of which pendulum supporting ribbons 3 are secured. The ribbons 3 extend downwardly along the rails 2 and their lower ends are attached to the lower ends of fulcrum sectors 4 formed integrally on the upper ends of pendulum bodies 5 and 6. There are two of the fulcrum sectors 4 on each of the pendulum bodies 5 and 6 to correspond to the four pendulum supporting ribbons 3 and side rails 2.

Load forces to be counterbalanced are transmitted from a load supporting system to a steelyard rod 7 the upper end of which is carried in a crosshead 8 suspended from load ribbons 9. The load ribbons 9 are trained over power sectors 10 of the pendulums 5 and 6 with the ends of the load ribbons securely attached to the uppermost ends of the power sectors.

In each of the pendulums 5 and 6 the radius of the power sector 10 is greater than the radius of the fulcrum sectors 4 so that the sectors, in effect, form differential pulleys that roll upwardly along the side rails 2 when the forces to be counterbalanced are increased. Weights 11 adjustably mounted on tracks 12 of the pendulum bodies 5 and 6 are located with respect to the sectors so that as the pendulums roll upwardly with an increase in load, the weights swing outwardly and the force of gravity acting on the weights 11 resists this rolling motion in increasing amounts. The relationship between the radii of the sectors, the offset of the center of the power sector 10 with respect to the center of the fulcrum sectors 4 and the location and orientation of the tracks 12 is such that the pendulum bodies 5 and 6 rotate through equal increments of angle for equal increments of load applied to the steelyard rod 7. This relationship of equal angular rotation for equal increments of load holds for all positions to which the weights 11 may be adjusted along the tracks 12. Screws located between the tracks 12 engage portions of the weights 11 so that rotation of the knurled screw heads 13 provides an easy method for adjusting the position of the weights. Each of the weights 11 also includes an inclined track 14 on which is mounted a subweight 15. The subweights 15 are employed to adjust the center of gravity of the pendulums transversely of the tracks 12 and the orientation of the inclined tracks 14 with respect to the weights 11 is such that the half capacity indication of the scale may be adjusted without affecting the power of the pendulums—the difference in pull exerted on the steelyard rod 7 between the zero and full scale positions.

The pendulum bodies 5 and 6 are each provided with a bumper 16 having a semicircular face 17 which, when the pendulums swing below their zero positions, strikes rubber stops 18 mounted from a bracket 19 attached to the side of the sector guide 1. The arrangement of the stops 18 to cooperate with the semicircular face 17 of the pendulum bumper 16 serves to locate the pendulum as well as to arrest its motion.

The upward translation of the turning axes of the pendulums 5 and 6—the centers of the fulcrum sectors 4—is used as a measure of the load applied to the steelyard rod 7. This upward translation is precisely proportional to the load applied to the steelyard rod 7 since the pendulums 5 and 6 rotate through equal angles for equal increments of load. A rack drive frame 20 that is pivotally supported from the turning axes of the pendulums 5 and 6 carries a rack 21 the teeth of which mesh with the teeth of a pinion 22 mounted on an indicator shaft 23. The indicator shaft 23 is journaled in ball bearings 24 mounted in crosswebs 25 of the sector guide 1. The magnitude of loads being counterbalanced may be indicated by an indicating hand mounted on the indicator shaft 23 and arranged to cooperate with equally spaced indicia printed on an annular chart as is customarily employed in automatic scales.

The rack drive frame 20 consists of two main parts, the first of which is a yoke 26 (see also Figure V) having a flat center section terminating in downwardly directed ears 27 which carry pivot screws 28 engaging the ends of the turning axis of the pendulum 5, and having an overturned lip or retainer 29 the lower surface of which is parallel to and spaced above the central part of the flat portion. A groove 30 is cut in the upper surface of the flat portion of the yoke 26 and extends parallel to the turning axis of the pendulum 5. The other portion of the rack drive frame 20 comprises a yoke-like portion 31 having depending ears 32 in which are mounted pivot screws 33 that pivotally engage the pendulum 6 at the ends of its turning axis. An arm 34 rigidly attached to the yoke portion 31 extends past the sector guide 1 and then part of the way across the upper end of the pendulum 5 so that its end portion lies parallel to and above the turning axis of the pendulum 5. The end of the arm 34 carries a roller 35 that runs in the groove 30 and is held engaged in the groove 30 by the retainer 29.

A rack supporting arm 36 formed integrally with the rack drive frame arm 34 carries at its end a bearing socket 37 having a conical depression 38 (Figure VI) in which is received a slightly blunted conical point 39 of a pivot 40 thus forming a miniature ball and socket joint. The pivot 40 is set in a horizontal portion of an L-shaped rack balance arm 41, the upper end of which carries a balance weight 42. The rack 21 is rigidly mounted on the end of the horizontal portion of the rack balance arm 41. To avoid changes in rack meshing pressure as the scale is tipped out of level the rack 21 and the rack balance arm 41 including the weight 42 are proportioned so that the center of gravity of the combination is located at the tip of the cone pivot point 39. Thus, this system is in neutral equilibrium and additional force must be supplied to hold the rack in mesh with the pinion. This additional force is provided by a spring 43 one end of which is hooked into the upper end of the pivot member 40 and the other end of which is hooked into the end of an arm 44 that is attached to the rack drive arm 34. The point of attachment of the spring 43 to the pivot member 40 is substantially in line with the point of contact between the rack 21 and pinion 22 and the pivot point 39 so that rack meshing pressure is provided without exerting appreciable torque tending to cause or restrict rotation of the rack about a vertical axis.

Thus, this structure permits several degrees of freedom for the rack so that it may accurately align itself with the pinion and thus operate with a minimum of friction.

A screw 45 having an enlarged washer-like head 46 is threaded into the end of the arm 36 alongside the bearing socket 37 in position such that the washer-like portion 46 closely overlies the horizontal portion of the L-shaped rack balance arm 41 and thus prevents disengagement of the cone pivot from the socket during sudden changes in load. One side of the washer-like head 46 is cut away so that a half turn of the screw 45 releases the rack arm 41 for disassembly.

The rack 21 is still further guided by a rack guide 47 (Figure VIII) that is mounted on the end of a short adjustably mounted rod 48 in position such that fingers 49 of the rack guide 47 may straddle the rack 21. The sides of the fingers 49 adjacent the rack 21 are beveled from top and bottom so as to leave a ridge or obtuse edge facing the sides of the rack 21 thus eliminating any possibility for the rack to bind between the fingers.

It is customary when floating pendulums such as the pendulums 5 and 6 are employed in a weighing scale to provide some structure to prevent displacement of the fulcrum sectors 4 from the sides 2 of the sector guide 1. This restraint has ordinarily been provided by a rack drive frame that positively connects the turning axes of the pendulums. The improved rack drive frame illustrated in the drawings is incapable of providing such restraint. Therefore, guards 50 having vertical portions extending adjacent the path of the turning axes of the pendulums are provided to confine the pendulums to their intended paths of travel. The guards 50 are closely adjacent but normally not in contact with cylindrical bosses 51 of the pendulums 5 and 6 but, by contact with such cylindrical bosses, prevent the pendulum sectors from swinging away from the sector guide 1.

The rack drive frame 20 kinematically consists of two triangles the bases of which coincide with the turning axes of the pendulums 5 and 6 and the apexes of which meet at the point of contact between the groove 30 in the yoke 26 and the roller 35 in the end of the arm 34. One of these triangles, the one formed by the yoke 26, is vertical while the other is substantially horizontal. This system is exceedingly free from friction because neither pendulum attempts to restrain the other and because any misalignment in the paths of travel of the pendulums 5 and 6 as they roll up and down the vertical rails 2 of the sector guide 1 is accommodated by a rolling motion of the roller 35 along the groove 30. Small variations in the distance between the turning axes of the pendulums 5 and 6 is accommodated by rocking the yoke 26. As long as the yoke 26 remains substantially vertical, these small variations do not change the effective height of the rack 21 since the height of the groove 30 with respect to the turning axis of the pendulum 5 remains substantially constant for small changes in the plumbness of the yoke 26.

Since the rack supporting frame 20 in this construction is not required to hold the pendulum sectors against swinging motion away from the sector guide 1 the pivot points connecting the rack drive frame 20 to the pendulums may be made much more delicate and thus reduce the friction between the pendulums and the yokes.

As shown, particularly Figure IV, the turning axis of each pendulum is defined by countersunk holes 52 drilled in inserts 53 set into the pendulums 5 and 6 and serving as point centers for the conical tips of the pivot screws 28 and 33. To reduce the friction, the area of contact between the cone-pointed pivot screws 28 or 33 and the countersunk holes 52 is limited to substantially line contact at the shoulder between the conical and cylindrical portions of the holes 52. This is accomplished by making the included angle of the points of the cone-pointed screws 28 or 33 somewhat less than the included angle of the conical portions of the countersunk holes 52. Further reduction is made by keeping the cylindrical part of the hole 52 as small as possible. This construction, while not rugged enough to hold the pendulum sectors against undesired motion, is nevertheless strong enough to carry the rack and drive the indicator. The reduction in effective pivot diameter at the point of contact between the pivot screws and the inserts 53 reduces the friction at this point to less than one-quarter of that observed in conventional construction.

The improved rack drive system and pendulum retaining means, by separating the functions of retention and indication, permits a much lighter rack construction and much smaller pivots, both of which are important from an operational standpoint. The separate guards may be made heavy enough to withstand any force tending to drive the sectors of the pendulums 5 or 6 away from the siderails 2 of the frame 1 without in the least affecting the normal operation of the pendulums.

Various modifications and specific details of construction may be made in the apparatus disclosed without departing from the spirit and scope of the invention.

Having described the invention, I claim:

1. In an automatic weighing scale, in combination, a sector guide having vertically positioned side rails, a pair of pendulum bodies suspended from the side rails and arranged to roll upwardly along the rails to counterbalance a load, guards mounted from the sector guide for preventing substantial movement of the pendulum bodies away from the rails, a yoke pivotally connected to one of the pendulum bodies at the turning axis thereof, a frame having a yoke portion pivotally connected to the other of the pendulum bodies at its turning axis and having an arm extending from the yoke portion to said yoke, and an indicator drive a portion of which is suspended from the frame for driving an indicator according to the movement of the pendulums.

2. In an automatic weighing scale, in combination, a pair of pendulum bodies each of which has a turning axis the translation of which is a measure of load, a yoke supported for rotation about the turning axis of one of the pendulums, a frame having a yoke-like portion supported for rotation about the turning axis of the other pendulum and having an arm that engages said yoke, and means for supporting the rack of a rack and pinion indicator drive from said frame.

3. In an automatic weighing scale, in combination, a pair of pendulum bodies each of which has a turning axis the translation of which is a measure of load, a yoke pivotally supported for rotation about the turning axis of one of the pendulums, said yoke having a groove extending generally parallel to the turning axis, a frame having a yoke-like portion pivotally supported for rotation about the turning axis of the other pendulum, said frame having an arm extending to said yoke, anti-friction means engaging the arm and the groove in the yoke for operatively connecting the arm and the yoke, and means for suspending a rack from the frame.

4. In an automatic weighing scale, in combination, a pair of pendulum bodies each of which has a turning axis the translation of which is a measure of load, a yoke pivotally supported at the turning axis of one of the pendulums, said yoke having a groove extending generally parallel to the turning axis, a frame having a yoke-like portion pivotally supported at the turning axis of the other pendulum, said frame having an arm extending to said yoke, a wheel journaled in the end of said arm in position to engage the groove in said yoke for operatively connecting the arm and the yoke, and means for suspending a rack from the frame.

5. In an automatic weighing scale, in combination, a pair of pendulum bodies each of which has a turning axis the translation of which is a measure of load, a yoke pivotally supported at the turning axis of one of the pendulums, said yoke having a horizontally extending groove located in a vertical plane through the turning axis, a frame having a yoke-like portion pivotally supported at the turning axis of the other pendulum, the frame having an arm overlying the yoke, anti-friction means operatively connecting the arm to the groove in the yoke, and means for suspending a rack from the frame.

6. In an automatic weighing scale, in combination, a pair of pendulum bodies each of which has a turning axis the translation of which is a measure of load, a yoke pivotally supported at the turning axis of one of the pendulums, a frame having a yoke-like portion pivotally supported at the turning axis of the other pendulum, the frame having an arm overlying said yoke, means for supporting the arm from the yoke while permitting relative horizontal movement between the arm and the yoke, means for preventing vertical separation of the arm and the yoke, and means for supporting a rack from the frame.

7. In an automatic weighing scale, in combination, a pair of pendulum bodies each of which has a turning axis the translation of which is a measure of load, a yoke pivotally supported at the turning axis of one of the pendulums, said yoke having a horizontal groove located in a vertical plane through the turning axis, a frame having a yoke-like portion pivotally supported at the turning axis of the other pendulum, the frame having an arm overlying said yoke, a roller journaled in the end of the arm and engaging the groove in the yoke, means for preventing escape of the roller from the groove, and means for suspending a rack from the frame.

8. In an automatic weighing scale, in combination, a sector guide having vertical side rails, a pair of pendulum bodies suspended from the vertical side rails, each of the pendulum bodies having a turning axis, a yoke pivotally supported at the turning axis of one of the pendulums, a frame having a yoke-like portion pivotally supported at the turning axis of the other pendulum, the frame having an arm that passes the side of the sector guide with the end of the arm overlying said yoke, said yoke having a horizontal groove located in a vertical plane through the turning axis, a roller journaled in the end of the arm and adapted to engage the groove of the yoke substantially midway between the ends of the yoke, and means for suspending a rack from the frame.

9. In an automatic weighing scale, in combination, a sector guide having vertical side rails, a pair of pendulum bodies suspended from the vertical side rails, each of the pendulum bodies having a turning axis, a yoke pivotally supported from spaced apart points on the turning axis of one of the pendulums, a frame having a yoke-like portion pivotally supported on spaced apart points on the turning axis of the other pendulum, said frame having an arm that passes the sector guide and that has an end overlying said yoke, said yoke having a horizontal groove extending parallel to the turning axis, means engaging the groove for operatively supporting the arm of said frame, and means on the frame for suspending a rack from a point substantially in the plane of and generally equidistant from the spaced apart points of the turning axes of the pendulums.

10. In an indicator drive for a weighing scale, in combination, a pair of pendulum bodies having turning axes the translation of which are to be indicated as a measure of load, a yoke supported at one of the turning axes, a frame having a yoke-like portion supported at the other of the turning axes, the frame including an arm that is supported from said yoke, a second arm included in the frame and positioned generally parallel to and midway between the turning axes of the pendulum bodies, said second arm having a conical cavity, a rack assembly having a downwardly directed pivot point at its center of gravity which pivot point is receivable in the conical cavity, and resilient means attached to the rack assembly and the frame for biasing the rack in a prescribed direction.

11. An indicator drive according to claim 10 in which a guard prevents disengagement of the pivot point from the conical cavity.

12. An indicator drive according to claim 10 in which the head of a screw threaded into the second arm serves as a guard to prevent disengagement of the pivot point from the conical cavity.

LAWRENCE S. WILLIAMS.

No references cited.